Aug. 25, 1931.    H. BRUCKER    1,820,648
FLY AND LEADER RECEPTACLE
Filed Dec. 4, 1929    2 Sheets-Sheet 1
Fig. 1
Fig. 2
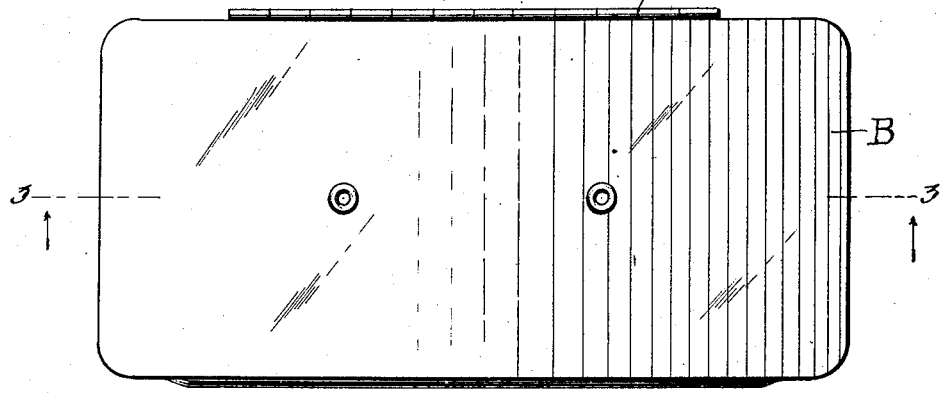
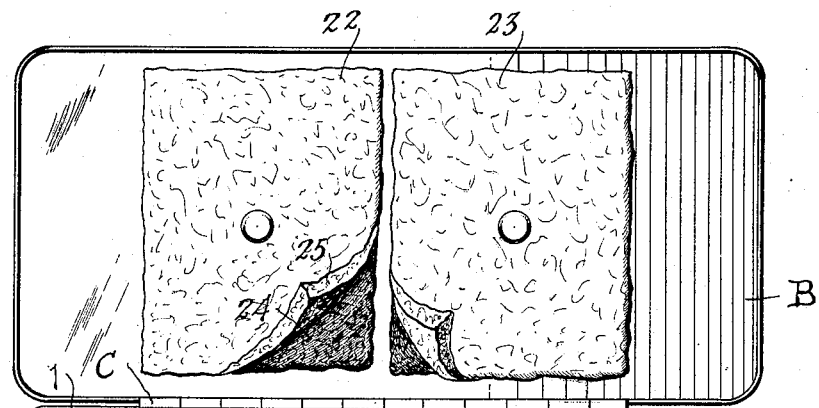
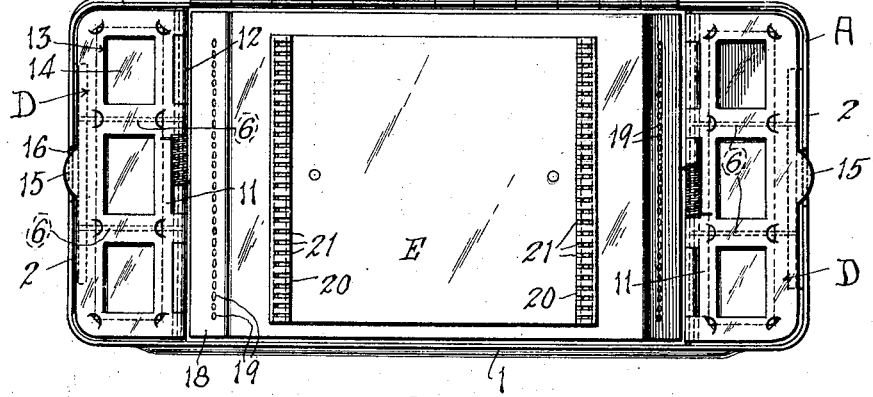
INVENTOR
Henry Brucker,
BY
ATTORNEYS Aug. 25, 1931.   H. BRUCKER   1,820,648
FLY AND LEADER RECEPTACLE
Filed Dec. 4, 1929   2 Sheets-Sheet 2
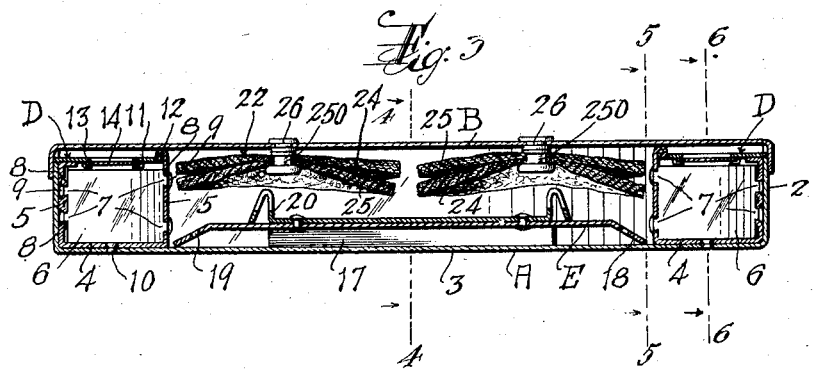
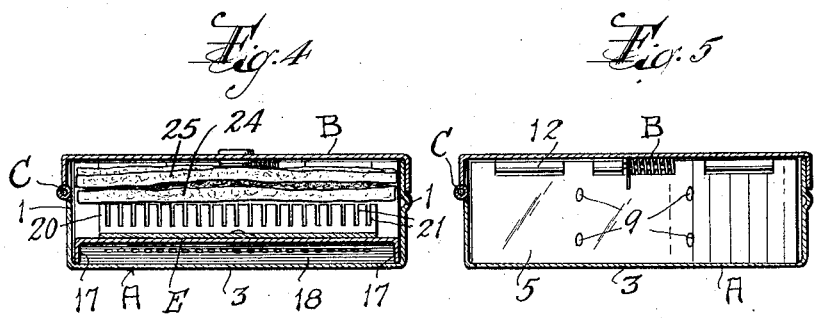
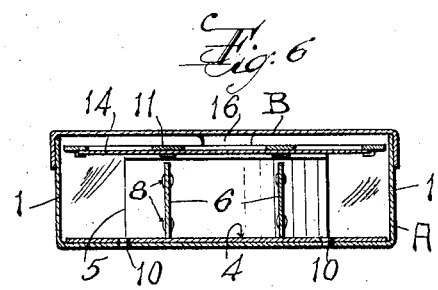
INVENTOR
Henry Brucker
BY
ATTORNEYS Patented Aug. 25, 1931

1,820,648

UNITED STATES PATENT OFFICE

HENRY BRUCKER, OF MAPLEWOOD, NEW JERSEY, ASSIGNOR TO AMERICAN ALUMINUM WARE CO., A CORPORATION OF NEW JERSEY

FLY AND LEADER RECEPTACLE

Application filed December 4, 1929. Serial No. 411,455.

This invention relates in general to a receptacle for fishing flies, and artificial bait or leaders, one object of the invention being to provide such a receptacle embodying novel and improved features of construction, whereby all of the necessary flies and leaders can be conveniently packed and carried in easily accessible positions in a single receptacle.

Another object is to provide a receptacle of this character embodying novel and improved features of construction so as to provide ample protection to the bait and leaders and to withstand the hard usage to which such a receptacle may be subjected.

Other objects are to provide a fly and leader receptacle including a body portion and a cover, and a novel and improved combination and arrangement of a leader supporting tray and holding means for flies within the body portion of the receptacle, whereby the space in the receptacle is efficiently utilized and all of the paraphernalia is easily accessible and the holding means for the flies serves to yieldingly hold the leader tray against movement in the receptacle and as a shock absorbing pad therefor, and to obtain other advantages and results as will be brought out by the following description.

Referring to the accompanying drawings in which corresponding and like parts are designated throughout the several views by the same reference characters, Figure 1 is a top plan view of the fly and leader box embodying my invention.

Figure 2 is a similar view with the cover in open position.

Figure 3 is a longitudinal vertical sectional view on the line 3—3 of Figure 1, and Figures 4, 5, and 6 are transverse vertical sectional views on the respective lines 4—4, 5—5, and 6—6 of Figure 3.

Specifically describing the illustrated embodiment of my invention the receptacle includes a body portion A substantially rectangular in shape and having a cover B hinged at C to one side thereof. The body portion includes the sides 1, ends 2 and bottom 3.

At each end of the body portion is arranged a container D for artificial flies or other artificial bait, each container D including a bottom 4 and sides 5 formed of one piece of material, and extending transversely of the corresponding end of the body portion for substantially the full width thereof.

Each container also has a plurality of transverse partitions 6 secured to the respective sides as by lugs 7 on the partitions projecting through openings 8 in the sides 5 and upset or riveted as at 9. These partitions divide the containers into a plurality of pockets to receive different types of artificial bait. The bottom of each of the containers is rigidly secured to the bottom of the body portion A as by rivets 10, and one side of each container is in abutting relation to the corresponding end of the body portion. The sides 1 of the body portion serve as ends for the containers. A spring closed cover 11 is hingedly connected at 12 to the innermost side 5 of each of the containers, and said covers preferably have apertures 13 one for each pocket which are preferably closed by transparent material such as celluloid or mica 14. Each cover 11 has a finger-hold 15 which projects beyond the end of the body portion through a notch 16.

With this construction it will be observed that the containers D in addition to holding the artificial bait also reenforce the corresponding end parts of the body portion A.

Removably mounted upon the body of the body portion between the containers D is a leader supporting tray E preferably formed of sheet metal with side and end flanges 17 and 18 respectively, in the latter of which are a plurality of perforations 19 for hooks. The tray also includes clips 20 which are transversely slotted at 21 to receive the leaders, one of which may be inserted in each two corresponding slots of the clips 20.

Means for holding dried flies may be mounted upon the inner side of the cover B of the receptacle so as to occupy the space above the leader tray and hold the latter in position. This means is shown as comprising two series 22 and 23 of layers of soft fibrous material such as flannel or felt. Each series includes a plurality of layers 24 and 25 between which the dried flies may be placed, and said layers are shown as secured to the socket member 250 of a head and socket separable fastener, the head element 26 of which is secured to the cover of the receptacle and projects from the inner side thereof. With this construction the holders 22 and 23 may be removed from the box by separating the socket elements 250 from the respective head elements 26.

It will be observed that by opening the cover B of the receptacle, the leader tray, both containers D and the dried fly holders 22 and 23 are all easily accessible, and all of the parts are effectively and compactly arranged within the receptacle so that a maximum of material can be packed in the receptacle in a minimum of space.

Obviously the details of construction of the box may be modified or changed by those skilled in the art without departing from the spirit or scope of the invention, and therefore I do not desire to be limited in the construction and use of my invention except as required by the following claim when construed in the light of the prior art.

Having thus described my invention, what I claim is:

A leader and fly receptacle comprising a body portion and a cover, a leader supporting tray removably arranged in said body portion, and a soft fibrous body to receive flies secured to the inner side of said cover so as to occupy the space between said leader tray and the cover to yieldingly hold the tray against movement in the receptacle and serve as a shock absorbing pad therefor.

HENRY BRUCKER.